United States Patent
Kiemle

[11] 3,806,221
[45] Apr. 23, 1974

[54] HOLOGRAPHIC METHOD OF RECORDING AND REPRODUCING ETCHING MASKS

[75] Inventor: Horst Kiemle, Munich, Germany

[73] Assignee: Siemens Aktiengesellschaft, Berlin, Germany

[22] Filed: Nov. 16, 1971

[21] Appl. No.: 199,369

Related U.S. Application Data

[63] Continuation of Ser. No. 880,075, Nov. 26, 1969, abandoned.

[30] Foreign Application Priority Data

Nov. 29, 1968 Germany.............................. 1811852

[52] U.S. Cl..................................... 350/3.5, 96/36.2
[51] Int. Cl....................... G02b 27/00, G03c 5/04
[58] Field of Search ............. 350/3.5; 96/36.2, 27 H

[56] References Cited
UNITED STATES PATENTS

| | | | |
|---|---|---|---|
| 3,514,176 | 5/1970 | Brooks et al.......................... | 350/3.5 |
| 3,526,505 | 9/1970 | Kroemer............................... | 350/3.5 |
| 3,602,570 | 8/1971 | Greenaway........................... | 350/3.5 |

OTHER PUBLICATIONS

Leith et al., Applied Optics, Vol. 5, No. 8, Aug. 1966, pp. 1303-1311.

Stroke, Scientific Research, Sept. 1967, pp. 41-46.

Stong, Scientific American, Feb. 1967, pp. 122-128.

*Primary Examiner*—Ronald J. Stern
*Attorney, Agent, or Firm*—Herbert L. Lerner

[57] ABSTRACT

Substantially two-dimensional objects are holographically recorded and reproduced by directing a light beam of a spherical reference wave onto one side of a planar hologram carrier and directing the object wave upon the opposite side, the object being centered upon the normal which passes from the wave center of the reference wave onto the hologram carrier which is larger, preferably very much larger than the object. The hologram photographically recorded on the carrier is reproduced by directing toward the hologram carrier a spherical reproducing wave whose wave center location relative to the hologram carrier is coincident with that of the reference wave used for recording, but whose directional propagation is opposed to that of the reference wave.

1 Claim, 7 Drawing Figures

HOLOGRAPHIC METHOD OF RECORDING AND REPRODUCING ETCHING MASKS

This is a continuation of application Ser. No. 880,075, filed Nov. 26, 1969, now abandoned.

My invention relates to a holographic method, applicable for such purposes as the lensless projection of area-type objects onto a plane, according to which a hologram of the object is recorded and the projected image desired of the object is obtained by reproducing the hologram.

Various technological applications of holography, involving the reproduction of real images for thereby exposing photosensitive layers, pose the problem of ensuring that the projected image of the originally recorded object is virtually free of distortions. Of particular significance in this respect is the lensless projection of etching masks for the fabrication of semiconductor devices, such as transistors or integrated circuits. Such an etching mask is to cover those portions of a photosensitive coating on a semiconductor substrate that, after exposure of the photographic coating, are not to be subjected to etching. As a rule, the extremely fine structures and textures to be processed in this manner, call for applying the method of contact copying in which the etching mask is a diapositive and, during exposure, must be firmly pressed upon the photosensitive layer, the side of the photographic emulsion of the diapositive being in contact with the workpiece. This entails the danger that the etching masks may readily become damaged.

The use of holography has made it possible to avoid such trouble by exposing the photosensitive layer of the semiconductor substrate to the optical projection of an image of the etching mask without requiring any contact with the plane formed by the photosensitive coating of the substrate. The method also secures a high resolving power of the magnified image thus used instead of a mask. The holographic masking method is performed, for example, by producing a holographic recording of an enlarged model of the etching mask with the aid of a lens arrangement, the reduction in size being such that the image of the model corresponds to the desired size of the mask. A hologram is then produced from this image of the mask. When reproducing the hologram, the reconstructed image of the etching mask is projected upon the photosensitive coating of the semiconductor plate or other substrate.

Aside from the requirement for a distortion-free projection of the reconstructed image of the etching mask upon the photosensitive coating at a given scale of reproduction, it is also essential to secure a sufficiently high illumination contrast of the reproduction. Heretofore, however, the contrast of the reconstructed image has always been greatly impaired by stray light of the reproducing wave, the cause of such stray residing in the granular texture of the photographic emulsion receiving the hologram.

Another difficulty in performing the lensless projection of any desired area-type objects onto photosensitive layers is constituted at the present state of the art by the fact that holograms are preferably recorded with laser light of relatively long wavelength, preferably red light, whereas the usual photosensitive materials require exposure to light of shorter wavelength, preferably blue light.

It is an object of my invention to improve holographic methods of the above-described general type by affording a simple way of providing optimal conditions with respect to minimizing or avoiding the troublesome and inevitable stray light.

Another object of my invention is to devise a holographic method, generally of the above-mentioned type, which affords using light of greatly different wavelength of recording and reproducing respectively the hologram.

To achieve these objects, and in accordance with my invention, I produce a lensless projection of area-type, i.e., substantially two-dimensional, objects onto a plane by proceeding as follows: I direct a beam of a spherical reference wave onto one side of the hologram carrier which is of much larger dimensions than the substantially two-dimensional object, and I direct the light beam of the object wave (also called "subject wave") onto the opposite side of the hologram carrier, such as a photographic plate upon which the hologram is to be recorded. The illumination is otherwise carried out in the known manner, the reference wave and the object wave being preferably derived from the same laser beam to have exactly the same wavelength. During illumination of the hologram carrier, the object is centered upon the normal line passing from the hologram carrier through the wave center of the reference wave. In this manner, a hologram of the Lippmann-Bragg type is recorded on the carrier, which thereafter is photographically developed in the conventional manner. For reproducing the recorded hologram, I direct toward the hologram carrier a beam of a spherical reproducing wave whose wave center locality, relative to the hologram carrier, is coincident with that of the reference wave previously used for recording the hologram, but whose directional propagation is opposed to that of the reference wave.

According to another feature of my invention, it is particularly advantageous to place the wave center of the reference wave during recording, and the reproducing wave during reproducing of the hologram, infinitely far away in the optical sense from the hologram carrier. In other words, it is preferable to have both waves impinge upon the planar hologram carrier in a direction perpendicular to this carrier.

Particularly favorable results are obtainable with the method according to the invention when the area-type object, during recording, is centered upon the center normal of the hologram carrier.

The invention will be further described with reference to the accompanying drawings in which FIGS. 1 to 3 are explanatory and FIGS. 4 to 7 relate to embodiments of the method according to the invention. More specifically;

Figure 1:
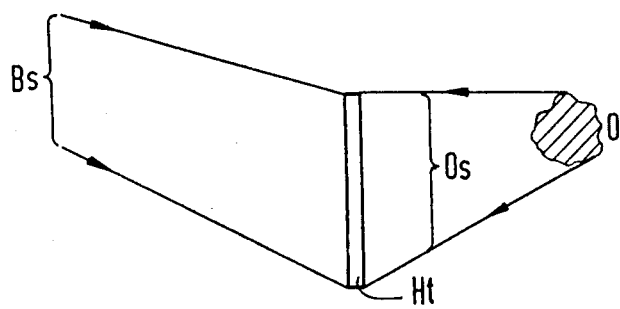
FIG. 1 shows schematically a recording arrangement for a Lippmann-Bragg hologram.
Figure 2:
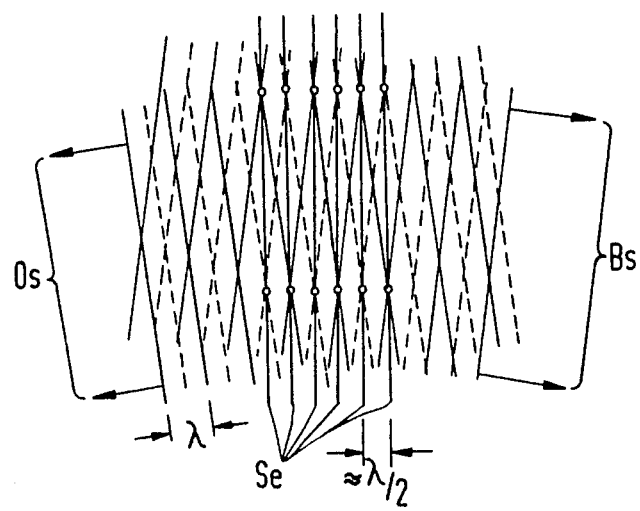
FIG. 2 is a diagram for explaining the physical effect of the Lippmann-Bragg hologram.

The method according to the invention makes use of a recording technique according to which, as shown in FIG. 1, a reference wave Bs and the object wave Os of the object to be recorded impinge upon different sides respectively of the planar hologram carrier Ht. As indicated in FIG. 2, the superposition of the two waves within the photosensitive layer results in the formation of planes Se of maximum blackening which extend substantially parallel to the hologram plane and whose mutual distances are approximately equal to one-half of the wavelength $\lambda$ of the reference wave Bs. Geometrically, these planes Se of maximum blackening are exact hyperboloids which exhibit reflecting properties with respect to a wave of light impinging thereupon. The normally wide-band reflectivity of the individual hyperboloid surfaces is converted to an extremely narrow bandwidth due to the staggering of these surfaces along the depth of the photographic emulsion at a mutual spacing of one-half of the wave length $\lambda$. More specifically, this is due to the fact that incident light, whose half-wave length is equal to the mutual spacing between two successive planes of maximal blackening Se, will exhibit a phase-correct addition of the respective shares reflected at the individual planes, whereas incident light having a wavelength appreciably different from the length $\lambda$, with respect to its reflection at the different planes of maximal blackening, can become effective with an only slight intensity in comparison with the first-mentioned cumulative reflection and therefore does not contribute to the reproduction of the recorded image. Only the reflection of the first-mentioned kind is thus decisive for the reconstruction of the recorded image, and this essential reflection, aside from its narrow bandwidth, increases in intensity with an increase in the thickness of the photosensitive layer, in comparison with the wavelength $\lambda$ of the reference wave Bs. In other words, such a volumetric hologram produces in itself the necessary monochromatism in the reproduction and therefore the time coherence of the light, when white light is used for reproduction of the hologram in lieu of a monochromatic radiation of suitable wavelength.

On account of the similarity between the recording made with the old Lippmann color photography and due to the fact that the phase-true addition of the individual reflections corresponds to the Bragg effect known from X-ray crystallography, holograms of the just-mentioned kind have been named Lippmann-Bragg holograms. System-theoretically, they can be looked upon as being periodic chain conductors with a narrow blocking region at the wavelength at which they were recorded. In the blocking range there occurs a high reflection and in the transparent ranges a very slight reflection.

Before explaining more in detail with reference to FIG. 3 how blurring due to stray light occurs when reproducing a hologram recorded in the known manner and how this is avoided by virtue of my invention, two embodiments of the method according to the invention will first be described with reference to FIGS. 4 to 7.

Figure 4:
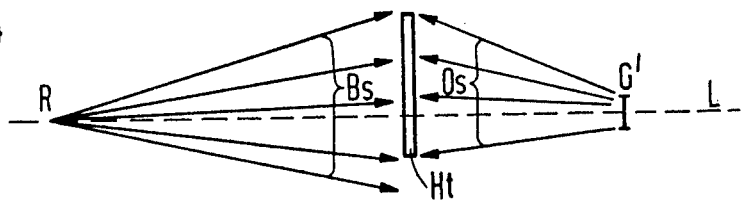
FIG. 4 illustrates schematically a hologram recording arrangement according to the invention.

In FIG. 4, there is shown schematically a beam of reference light Bs issuing from a laser. The wave center R of this reference wave is located at a predetermined distance from the hologram carrier Ht, a photographic plate carrying the photographic emulsion. The object G' to be recorded, constituting an etching mask in the form of a diapositive, has its surface oriented in parallel relation to the plane of the hologram carrier Ht and centered upon the line L extending perpendicularly to the hologram carrier and passing through the excitation center R of the reference wave Bs. The object wave is denoted by Os.

Figure 5:
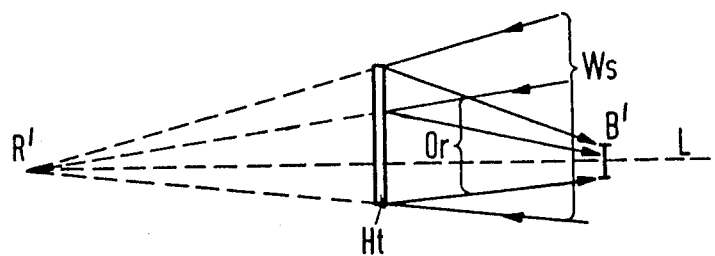
FIG. 5 illustrates schematically a hologram reproducing arrangement according to the invention.

The hologram recorded with the arrangement according to FIG. 4 is reproduced with the aid of an arrangement as diagrammatically represented in FIG. 5. The reproducing wave, like the reference wave, is spherical with respect to its distance from the hologram carrier Ht, the wave center at point R' of the reproducing wave is spatially identical with the wave center of the reference wave Bs used for recording. In contrast to the reference wave Bs, however, the reproducing wave has a propagating direction opposed to that of the reference wave; that is, according to FIG. 5 the reproducing wave Ws impinges upon the hologram carrier Ht at the side or face opposite to the side or face illuminated by the reference wave Bs in FIG. 4. The image B' appears on the the incident of the incidnt reproducing wave Ws at the scale 1 : 1 and is centered about the line L normal to the plane of the hologram carrier. In the embodiment according to FIGS. 4 and 5 it is assumed that reference wave and reproducing wave have the same wavelength.

Figure 6:
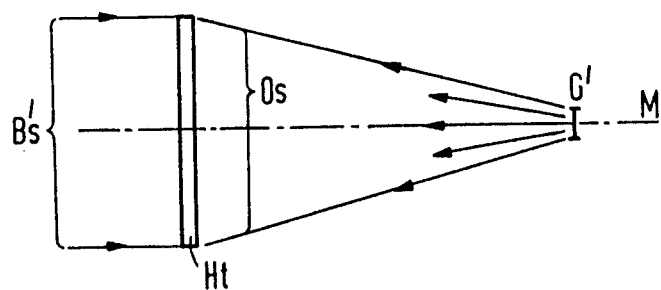
FIG. 6 shows schematically another embodiment of a hologram recording arrangement according to the invention.
Figure 7:
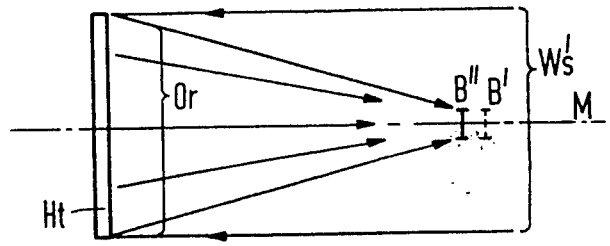
FIG. 7 is a schematic representation of another hologram reproducing arrangement according to the invention.

FIGS. 6 and 7 show diagrammatically arrangements for recording and reproducing a hologram and generally correspond to the arrangements of FIGS. 4 and 5 respectively. However, the reference and reproducing waves applied according to FIGS. 6 and 7 are planar, i.e., they may be looked upon as spherical waves whose wave centers (corresponding to points R and R' of FIGS. 4 and 5) are located at an optically infinite distance from the hologram carrier. The planar reference wave Bs', according to FIG. 6, impinges perpendicularly upon one side or face of the hologram carrier Ht. The object G' to be recorded is located on the opposite side of the hologram carrier Ht and is centered upon the center normal M of the carrier Ht.

In the reproducing arrangement according to FIG. 7 the reproducing wave Ws' also is a planar wave which travels in opposition to the propagating direction of the reference wave Bs according to FIG. 6. The image B'' produced by the reconstructed object wave Or appears centered about the center normal M at the scale 1 : 1. The image B'' is produced on the side where the reproducing wave Ws' impinges upon the hologram carrier.

Since the screen upon which this image is to appear, covers a portion of the hologram surface, it is of significance in arrangements according to FIGS. 4 and 5 or FIGS. 6 and 7 that the dimensions of the screen or the dimensions of the object G' during recording are small in comparison with the dimensions of the hologram. As shown in the drawing, the hologram carrier Ht is exemplified as being linearly more than four times as long as the object corresponding to a difference in at least one decimal order of magnitude with respect to the respective areas of object and hologram.

In the embodiment according to FIGS. 6 and 7 it is assumed that the recording of the hologram is performed with light of a longer wavelength than that used for reproduction. This requires that the hologram during or after photographic development is subjected to a correspondingly conducted shrinking process. One way of doing this is to first develop the photographic emulsion to produce a permanent photographic image and then subjecting the emulsion, still in the wet state, to shrinking solutions known for such purposes. without such shrinking, a reproduction of the recorded image with the aid of recording light having the same wavelength as the reference wave, would result in making the image B'' appear as an image B' (FIG. 7) whose distance from the hologram carrier Ht is equal to the corresponding distance of the object G' from the hologram carrier Ht during recording. Due to the shrinkage and the use of a correspondingly shorter reproducing wavelength, the image is shifted only along the center normal M in the direction toward the hologram carrier Ht. Its departures in directions perpendicular to the plane of illustration, however, do not change, as is desired.

By virtue of the invention, namely on account of the above-mentioned relations between object wave, reference wave and reproducing wave, the reconstructed image can be made free of distortion, can be kept on the scale 1 : 1, and also exhibits an excellent intensity contrast, because with this kind of recording and reproduction the stray light of the reproducing wave issuing from the hologram in the direction toward the reconstructed image has its intensity minimum.

The method according to the invention also affords the advantage that a difference in wavelength between reference wave and reproducing wave, to the extent such difference is limited to the phase-true addition of the individual reflections at the respective planes of maximal blackening, has virtually no detrimental effect upon the sharpness of the reconstructed image.

Figure 3:
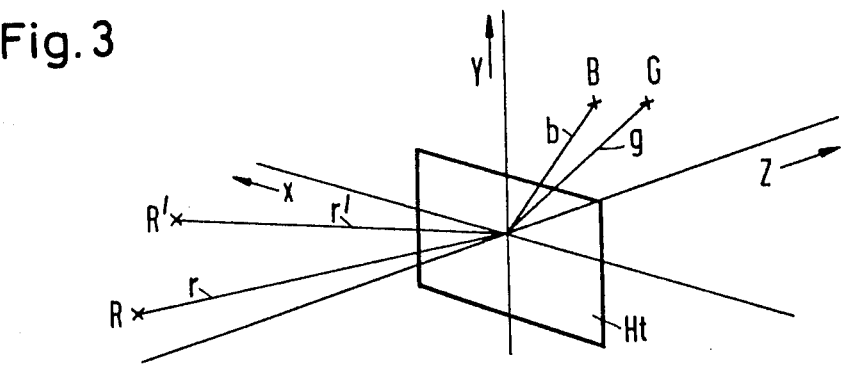
FIG. 3 is another diagram for explaining the impairment in the sharpness of the image occurring with the reproduction of Lippmann-Bragg holograms.

This will be further explained presently with reference to FIG. 3 by an analysis of image sharpness conditions.

The diagram in FIG. 3 represents a hologram carrier Ht and a spatial coordinate system $XYZ$. The $Z$-axis of the coordinate system is perpendicular to the $XY$-plane identical with the plane of the hologram carrier. A point G of an object having the coordinates $X_G$, $Y_G$ and $Z_G$ is represented in the hologram as a point $B$ (image point) with the coordinate values $X_B$, $Y_B$ and $Z_B$. Assume that the reference wave issues from the origin point $R$ (wave center) having the coordinates $X_R$, $Y_R$ and $Z_R$. For reproducing the image of the recorded object, the hologram carrier is illuminated from a light source located at the wave-center point $R'$ whose coordinates are $X'_R$, $Y'_R$ and $Z'_R$. The imaging equations for the hologram then are:

$$\lambda' (X_G/g - X_R/r) - \lambda (X_B/b - X'_R/r') = 0 \quad 1$$

$$\lambda' (Y_G/g - Y_R/r) - \lambda (Y_B/b - Y'_R/r') = 0 \quad 2$$

$$\lambda' (1/g - 1/r) - \lambda (1/b - 1/r') = 0 \quad 3$$

In these equations, $\lambda$ and $\lambda'$ denote the wavelength of the light sources during recording and reproducing, and $g$, $b$, $r$ and $r'$ the distances of the points $C$, $B$, $R$ and $R'$ from the origin of the coordinate system.

The displacement imparted to the point B by a change $\Delta \lambda'$ of the wavelength $\lambda'$ is a vector whose components in the three-dimensional coordinate system are $\Delta X_F$, $\Delta Y_F$ and $\Delta Z_F$. These components can be calculated by differentiation of the components of the image point $X_B$, $Y_B$ and $Z_B$ over $\lambda'$, and by multiplying the result with reflection bandwidth of a hologram represented by the change $\Delta \lambda'$. By differentiating the equations (1) to (3) there result for the three components of this displacement vector the equations:

$$\Delta X_F = X_B - X'_R/r' \cdot b \cdot \Delta\lambda'/\lambda' \quad 4$$

$$\Delta Y_F = Y_B - Y'_R/r' \cdot b \cdot \Delta\lambda'\lambda' \quad 5$$

$$\Delta Z_F = b/Z_B(b/r' - 1) \cdot b\Delta\lambda'/\lambda' \quad 6$$

Due to the finite bandwidth $\Delta \lambda'$ of the reproduction, the image point becomes drawn out to a line whose length is proportional to the bandwidth of the change $\Delta \lambda'$.

As will be recognized from equations (4) to (6), the method according to the invention causes the $X$ and $Y$ components of the displacement vector describing the color unsharpness to vanish. This elimination of the $X$ and $Y$ components, at a finite distance of the wave centers of reference and reproducing waves, is predicated upon the fact that according to the invention the component $X'_R$ of the reproducing wave center and the component $X_B$ of the center point of the image produced according to the invention are exactly equal. The maximally permissible color blurring in the $XY$-plane, however, still determines the maximum dimensions of the image. With an infinite spacing of the wave centers of reference and reproducing waves, i.e., a perpendicular incidence of these waves, the $X$ and $Y$ components of the displacement vector are equal to zero because $r'$ is infinite independently of the position which the image point occupies in the $XY$-plane. Consequently, a difference between the wavelengths during recording and reproducing has only the consequence of displacing the entire reconstructed image in the direction of the $Z$-coordinate which is perpendicular to the plane constituted by the hologram carrier. This displacement is of no significance with area-type objects, particularly if their surface during recording is at least approximately parallel to the plane of the hologram carrier.

The method according to the invention is of particular importance when applied for projecting etching masks upon the photosensitive layer of semiconductor substrates for the production of electronic semiconductor components and integrated circuits. The monochromatic light sources (lasers) presently available at relatively low cost while insuring high technological quality, usually produce light of relatively long wavelength in the red region of the spectrum. As mentioned, the most commonly employed photosensitive layers generally require exposure to light of shorter wavelength in the blue region. Since only the recording of the hologram requires laser light, it is desirable to perform the recording of the hologram with long-wave light, particularly red light. This desired recording technique is afforded and facilitated by virtue of the invention. For this purpose, and as explained above, the exposed photoelectric layer on the hologram carrier, during or after photographic development, is subjected to controlled shrinking in such a manner that when thereafter the hologram is reproduced with light of a given shorter wavelength, preferably blue light, and optically intensive and distortion-free image is produced. Investigation has shown that during shrinking the hyperboloidal surfaces of maximum blackening change to the shape of new hyperboloids whose surfaces and focal points are closer to each other in accordance with the shrinking factor, provided the hologram carrier during recording is so oriented that its plane is directed perpendicularly to a straight line interconnecting the points $R$ and $G$ according to FIG. 3. The shrunken hologram, therefore, behaves in this case as if during recording all dimensions and the wavelength had been reduced by this factor. In other words, the reproduction of the image at the shorter wavelength is free of aberration.

What is claimed is:

1. The method of lens-free projection of an image of an integrated circuit etching mask of planar shape onto a semiconductor substrate coated with a photosensitive layer responsive to substantially only blue light comprising the steps of:

forming a Lippmann-Bragg hologram of said etching mask by directing a spherical reference light wave, emanating from a wave center and having a wave length of substantially red light, onto one face of a photographic plate having two opposing planar faces, from one side thereof, said photographic plate having a larger area than the area of said etching mask, and directing an object light wave having a wave length of substantially red light from said etching mask onto the other face of said photographic plate from the other side thereof, said etching mask being centered on a line perpendicular to the faces of said photographic plate and passing through said plate and the wave center of the spherical reference wave, said planar etching mask being oriented substantially parallel to said faces;

uniformly shrinking said hologram during development of said photographic plate by an amount such that a distortion-free image may be reconstructed from said hologram with substantially blue light; and reconstructing a real image from the shrunken hologram on said substantially only blue photosensitive layer of said semiconductor substrate by directing toward the shrunken hologram a spherical reproducing light wave of substantially blue light having a wave center coinciding with the position of the wave center of the spherical reference wave relative to the photographic plate and having a direction of propagation opposite to that of the reference wave.

* * * * *